United States Patent [19]

Scheer et al.

[11] 4,211,787

[45] Jul. 8, 1980

[54] ANTIBACTERIAL AGENTS EFFECTIVE IN GROWTH PROMOTION AND INCREASED FEED UTILIZATION

[75] Inventors: Martin Scheer, Wuppertal; Heidrun Anke, Tuebingen; Wilfried König, Pinneberg; Hans Zähner, Tuebingen, all of Fed. Rep. of Germany

[73] Assignee: Bayer Aktiengesellschaft, Leverkusen, Fed. Rep. of Germany

[21] Appl. No.: 960,206

[22] Filed: Nov. 13, 1978

[30] Foreign Application Priority Data

Dec. 1, 1977 [DE] Fed. Rep. of Germany ....... 2753513

[51] Int. Cl.² .......................................... A61K 31/335
[52] U.S. Cl. .................................................... 424/279

[58] Field of Search ........................................ 424/279

[56] References Cited

U.S. PATENT DOCUMENTS 3,838,171  9/1974  Scott et al. ........................... 424/279

Primary Examiner—V. D. Turner
Attorney, Agent, or Firm—Sprung, Felfe, Horn, Lynch & Kramer

[57] ABSTRACT

The invention provides compositions containing cladosporin and/or analogs of cladosporin. Said composition in the form of treated feed compositions or treated drinking water promote and accelerate the growth of animals and improve feedstuff utilization.

7 Claims, No Drawings

ANTIBACTERIAL AGENTS EFFECTIVE IN GROWTH PROMOTION AND INCREASED FEED UTILIZATION

The present invention relates to the use as antibacterial agents cladosporin and/or a derivative thereof.

The invention furthermore relates to the use of cladosporin and/or a derivative thereof in animal nutrition.

According to the present invention there is provided a pharmaceutical composition containing as an active ingredient a compound of the general formula

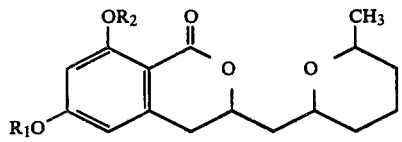

in which $R_1$ and $R_2$ independently denote a hydrogen atom or a methyl or acetyl group, in admixture with a solid or liquefied gaseous diluent or in admixture with a liquid diluent other than a solvent of a molecular weight less than 200 except in the presence of a surface active agent.

Cladosporin i.e. the compound of formula (I) in which $R_1$ and $R_2$ denote hydrogen atom is preferably used.

According to the present invention there is further provided a method of promoting and accelerating the growth and improving feedstuff utilization of animals comprising administering to the animals a compound of formula (I) either alone, in admixture with a diluent, in the form of a medicament or in the form of a treated animal feed.

Cladosporin and compounds of the formula I are known from U.S. Pat. No. 3,838,171 and the publications P. M. Scott and W. van Walbeck [J. Antibiotics XXIV, 747–755 (1971)], G. N. Ellestad, P. Mirando and M. P. Kunstmann [J. Org. Chem. 38, 4204–4205, (1973)] and L. Cattel, J. F. Grove and D. Shaw [J. Chem. Soc. Perkin Trans. I 1972, 2626–2629], or they can be obtained from the known compounds in the customary manner. Surprisingly, it has now been found that cladosporin and compounds of the formula I exhibit an antibacterial activity against certain germs, in particular against *Bacillus brevis, Clostridium pasteurianum, Arthrobacter citreus* and *Sarcina lutea*, and in addition also against strains of *Escherichia coli, Streptomyces viridochromogenes* and *Nocardia brasiliensis*.

The antibacterial activity is determined by a series dilution test or plate diffusion test.

Table 1 shows the antibacterial activity of cladosporin, using four germs as examples, and indicates the conditions under which the tests are carried out.

Table 1

| Antibacterial activity of cladosporin | | | |
|---|---|---|---|
| Organism | Temperature [°C.] | Medium | MIC* (μg/ml) |
| *Arthrobacter citreus* ATCC 11,624 | 27 | I | 1.0–2.0 |
| *Bacillus brevis* ATCC 9999 | 37 | I | 0.05–0.1 |
| *Clostridium pasteurianum* ATCC 6013 | 30 | II | 0.05–0.1** |

Table 1-continued

| Antibacterial activity of cladosporin | | | |
|---|---|---|---|
| Organism | Temperature [°C.] | Medium | MIC* (μg/ml) |
| *Sarcina lutea* ATCC 381 | 27 | I | 2.0–5.0 |

MIC = minimal inhibitory concentration
*Series dilution test; incubation period of 15 hours; amount of inoculum/ml $2 \times 10^6$ cells
**Plate diffusion test
Medium: I nutrient broth (Difco); II 3 g of meat extract, 3 g of malt extract, 3 g of yeast extract 20 g of peptone, 5 g of glucose, 0.2 g of ascorbic acid, 14 g of agar and 1 l of water.

Furthermore, cladosporin and compounds according to formula I surprisingly have the property of promoting and accelerating growth in animals and of improving feedstuff utilisation, so that these compounds can be employed for the purposes mentioned in all spheres of animal breeding and keeping of animals.

The activity of the compounds used according to the invention is largely independent of the species and sex of the animals. Cladosporin and compounds according to formula I prove to be particularly valuable in the rearing and keeping of young animals and fattening animals. The following livestock and pets may be mentioned as examples of animals for which the compounds can be used for promoting and accelerating growth, for saving feedstuff and thus improving the feedstuff utilisation: warm-blooded animals, such as cattle, pigs, horses, sheep, goats, cats, dogs, rabbits, fur-bearing animals, for example mink and chinchillas, and poultry, for example chickens, geese, ducks, turkeys, broilers, pigeons, parrots and canaries, and cold-blooded animals, such as fish, for example carp, and reptiles, for example snakes.

Cladosporin and compounds of the formula I are preferably used in rearing and keeping ruminants, such as calves, goats and sheep, and for pigs and chicks.

The amount of cladosporin and/or compounds according to formula I which is administered to the animals in order to achieve the desired effect can be varied substantially. It is preferably about 5 to 500, in particular 10 to 100, mg/kg of body weight daily. The administration period can be from a few hours or days up to several years. The appropriate amount of active compound and the appropriate administration period depend, in particular, on the species, the age, the sex and the state of health of the animals and the manner in which the animals are kept and can be easily determined by any expert.

The compounds are administered to the animals by the customary methods. The nature of the administration depends, in particular, on the species, the behaviour and the state of health of the animals. Thus, administration can take place orally or parenterally once or several times daily, at regular or irregular intervals. For reasons of expediency, in most cases oral administration, in particular in the rhythm of the uptake of food and/or drink by the animals, is to be preferred.

The compounds can be administered as pure substances or in a formulated form, that is to say mixed with non-toxic inert carriers; by non-toxic inert carriers there are to be understood solid, semi-solid or liquid diluents, fillers and formulation auxiliaries of all kinds.

The compounds may be administered in a medicament in dosage unit form comprising a compound of formula (I) either alone or in admixture with a diluent.

The medicament may be in the form of tablets, pills, dragees, capsules or ampoules.

Cladosporin and/or compounds according to formula I, optionally in a formulated form, can also be administered in a suitable form together with pharmaceutical active compounds, mineral salts, trace elements, vitamins, protein substances, fats, dyestuffs and/or flavouring agents.

Oral administration together with the feed and/or drinking water is preferred, the active compounds being added to the entire amount or only some of the feed and/or drinking water, depending on the requirement.

The compounds can be admixed to the feed (giving a "treated animal feed") and/or drinking water in accordance with customary methods by simple mixing as pure substances, preferably in the finely divided form, or in a formulated form mixed with edible non-toxic carriers, optionally also in the form of a premix or a feed concentrate.

The feed and/or drinking water can contain, for example, the active compound according to the invention in a concentration of about 5 to 500, in particular 10 to 100, ppm. The optimum level of the concentration of the active compound in the feed and/or drinking water depends, in particular, on the amount of feed and/or drinking water taken up by the animals and can be easily determined by any expert.

The nature of the feed and its composition is immaterial. All the customary, commercially available or special feed compositions can be used, which preferably contain the customary equilibrium of energy substances and building substances, including vitamins and mineral substances, necessary for balanced nutrition. The feed can be composed, for example, of vegetable substances, for example hay, beet, cereals and cereal by-products, animal substances, for example meat, fats and bonemeal, fish products, vitamins, for example vitamin A, D complex and B complex, proteins, aminoacids, for example DL-methionine and inorganic substances, for example lime and sodium chloride.

Feed concentrates contain cladosporin and/or compounds according to formula I, in addition to edible substances, for example rye flour, maize flour, soya bean flour or lime, optionally with further nutrient substances and building substances as well as proteins, mineral salts and vitamins. They can be prepared by the customary mixing methods.

The premixes and feed concentrates contain 1 to 50% by weight, preferably 1 to 5% by weight of at least one compound of formula I.

Preferably, in premixes and feed concentrates, the active compounds can optionally also be protected from air, light and/or moisture by suitable substances which coat their surface, for example by non-toxic waxes or gelatine.

The following is an example of the composition of a feed, containing cladosporin, for rearing chicks: 200 g of wheat, 340 g of maize, 361 g of coarse soya bean meal, 60 g of beef tallow, 15 g of dicalcium phosphate, 10 g of calcium carbonate, 4 g of iodinated sodium chloride, 7.5 g of a vitamin/mineral mixture and 2.5 g of an active compound premix give, after careful mixing 1 kg of feed.

The vitamin/mineral mixture consists of: 6,000 I. U. of vitamin A, 1,000 I.U. of vitamin $D_3$, 10 mg of vitamin E, 1 mg of vitamin $K_3$, 3 mg of riboflavin, 2 mg of pyridoxine, 20 mg of vitamin $B_{12}$, 5 mg of calcium pantothenate, 30 mg of nicotinic acid, 200 mg of choline chloride, 200 mg of $MnSO_4 \times H_2O$, 140 mg of $ZnSO_4 \times 7H_2O$, 100 mg of $FeSO_4 \times 7H_2O$ and 20 mg of $CuSO_4 \times 5H_2O$.

The active compound premix contains cladosporin and/or a compound according to formula I in the desired amount, for example 100 mg, and in addition 1 g of DL-methionine and an amount of soya bean flour such that 2.5 g of premix are formed.

The following is an example of the composition of a feed, containing an active compound according to the invention, for rearing pigs: 630 g of shredded cereal feed (composed of 200 g of maize, 150 g of shredded barley, 150 g of shredded oats and 130 g of shredded wheat), 80 g of fishmeal, 60 g of coarse soya bean meal, 60 g of tapioca flour, 38 g of brewer's yeast, 50 g of a vitamin/mineral mixture for pigs (composition, for example, as in the case of the chick feed), 30 g of linseed cake meal, 30 g of maize gluten feed, 10 g of soya bean oil, 10 g of cane sugar molasses and 2 g of an active compound premix (composition, for example, as in the case of the chick feed), give, after careful mixing, 1 kg of feed.

The feed mixtures indicated are preferably intended for rearing and fattening chicks and pigs respectively, but they can also be used, in the same or similar composition, for rearing and fattening other animals.

14-day feeding tests on chicks and 7-week feeding tests on broilers, which received 5 ppm to 50 ppm of cladosporin with the feed, showed a significant increase in weight in the case of the animals treated with cladosporin in comparison with the animals fed without the addition of cladosporin.

What is claimed is:

1. A method of promoting and accelerating the growth and improving the feedstuff utilization of animals which comprise administering to the animals a compound of the formula

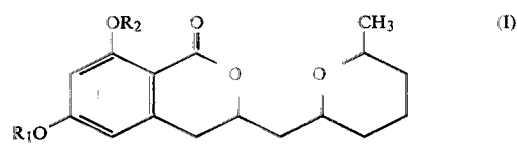

in which $R_1$ and $R_2$ independently denote a hydrogen atom or a methyl or acetyl group in an amount effective for providing or accelerating growth or for improving feedstuff utilization, either alone, in admixture with a diluent, in the form of a medicament, or in the form of a treated animal feed.

2. A method according to claim 1, in which the active compound is administered in an amount of 10 to 100 mg per kg body weight per day.

3. A method according to any of claims 1 or 2, in which the animals are ruminants.

4. A method according to any of claims 1 or 2, in which the animals are pigs.

5. A method according to any of claims 1 or 2, in which the animals are chicks or broilers.

6. A method according to any of claims 1 or 2, in which the active compound is administered orally.

7. A method of claim 1 in which said compound is cladosporin.